United States Patent
Doi et al.

(10) Patent No.: US 11,151,342 B2
(45) Date of Patent: *Oct. 19, 2021

(54) CODE INFORMATION READING APPARATUS AND METHOD FOR CALCULATING A DETECTION FREQUENCY OF A CODE IN A PLURALITY OF IMAGES

(71) Applicant: FUJITSU LIMITED, Kawasaki (JP)

(72) Inventors: Kazumi Doi, Fukuoka (JP); Masahiro Kihara, Fukuoka (JP); Masayoshi Nakashima, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,300

(22) Filed: Oct. 9, 2019

(65) Prior Publication Data
US 2020/0117864 A1    Apr. 16, 2020

(30) Foreign Application Priority Data
Oct. 15, 2018    (JP) .............................. JP2018-194634

(51) Int. Cl.
*G06K 7/10*    (2006.01)
*G06K 7/14*    (2006.01)

(52) U.S. Cl.
CPC ....... *G06K 7/10722* (2013.01); *G06K 7/1413* (2013.01); *G06K 7/1443* (2013.01)

(58) Field of Classification Search
CPC .. G06K 7/1404; G06K 7/1439; G06K 7/1443; G06K 7/1447; G06K 9/685

USPC .............. 235/462.07–462.07, 462.41, 462.1, 235/462.11, 494
See application file for complete search history.

(56) References Cited

U.S. PATENT DOCUMENTS

| | | |
|---|---|---|
| 8,340,498 B1 | 12/2012 | Gill et al. |
| 2010/0155464 A1 | 6/2010 | Swayn |
| 2011/0007967 A1 | 1/2011 | Soderberg et al. |
| 2013/0292473 A1 | 11/2013 | Soederberg et al. |
| 2015/0199589 A1 | 7/2015 | Suzuki |
| 2017/0061185 A1* | 3/2017 | Wang .................. G06K 7/1417 |
| 2020/0117864 A1 | 4/2020 | Doi et al. |

(Continued)

FOREIGN PATENT DOCUMENTS

| | | |
|---|---|---|
| JP | 09-185671 | 7/1997 |
| JP | 2007-72726 A | 3/2007 |
| JP | 2010-170539 A | 8/2010 |

(Continued)

OTHER PUBLICATIONS

USOA—Non-Final Rejection for related U.S. Appl. No. 16/596,973 dated Nov. 12, 2020.

(Continued)

*Primary Examiner* — Suezu Ellis
(74) *Attorney, Agent, or Firm* — Fujitsu Patent Center

(57) ABSTRACT

A code information reading apparatus includes a memory, and a processor configured to read, upon detecting a code from a plurality of images sequentially captured, code information of the detected code, perform calculation of a detection frequency, in the plurality of images, of the code corresponding to the code information, and perform output of the code information in accordance with the calculated detection frequency.

17 Claims, 18 Drawing Sheets

(56) References Cited

U.S. PATENT DOCUMENTS

2020/0117871 A1* 4/2020 Doi ................. G06K 7/1447

FOREIGN PATENT DOCUMENTS

| JP | 2011-513809 | 4/2011 |
| JP | 2015-84230 A | 4/2015 |

OTHER PUBLICATIONS

USOA—Final Rejection issued for related U.S. Appl. No. 16/596,973 dated Jun. 18, 2021.

* cited by examiner

FIG. 3

| FRAME NUMBER | 1 | 2 | 3 | 4 | 5 |
|---|---|---|---|---|---|
| RECOGNITION RESULT | 123456 | A06745 | | 123456 | 123456 |
| PROBABILITY | 123456 - 1/1 | 123456 - 1/2<br>A06745 - 1/2 | 123456 - 1/3<br>A06745 - 1/3 | 123456 - 2/4<br>A06745 - 1/4 | 123456 - 3/5<br>A06745 - 1/5 |

FIG. 9

| PROCESSING NUMBER | 1 | 2 | 3 | 4 |
|---|---|---|---|---|
| FRAME NUMBER | 1 | 1 | 2 | 2 |
| RECOGNITION RESULT | 12345 | abcde | 12345 | abcde |
| SIZE | 4×3 | 4×1 | 4×3 | 4×1 |
| GROUP | A | B | A | B |
| PROCESSING NUMBER | 5 | 6 | 7 | 8 |
| FRAME NUMBER | 3 | 3 | 4 | 5 |
| RECOGNITION RESULT | 12345 | acdg | 12345 | 12345 |
| SIZE | 4×3 | 4×1 | 4×3 | 4×3 |
| GROUP | A | B | A | A |

| GROUP | A | B | |
|---|---|---|---|
| RECOGNITION RESULT | 12345 | abcde | acdg |
| PROBABILITY | 5/5 | 2/3 | 1/3 |

FIG. 14

| PROCESSING NUMBER | 1 | 2 | 3 | 4 | 5 |
|---|---|---|---|---|---|
| FRAME NUMBER | 1 | 1 | 2 | 2 | 3 |
| RECOGNITION RESULT | 12345 | abcde | 12345 | abcde | 12345 |
| POSITION | (3, 4) | (10, 12) | (3, 3) | (10, 11) | (3, 2) |
| GROUP | A | B | A | B | A |
| PROCESSING NUMBER | 6 | 7 | 8 | 9 | 10 |
| FRAME NUMBER | 3 | 4 | 4 | 5 | 5 |
| RECOGNITION RESULT | acdg | 12345 | abcde | 12345 | abcde |
| POSITION | (10, 10) | (3, 1) | (10, 9) | (3, 0) | (10, 8) |
| GROUP | B | A | B | A | B |

| GROUP | A | B | |
|---|---|---|---|
| RECOGNITION RESULT | 12345 | abcde | acdg |
| PROBABILITY | 5/5 | 4/5 | 1/5 |

CODE INFORMATION READING APPARATUS AND METHOD FOR CALCULATING A DETECTION FREQUENCY OF A CODE IN A PLURALITY OF IMAGES

CROSS-REFERENCE TO RELATED APPLICATION

This application is based upon and claims the benefit of priority of the prior Japanese Patent Application No. 2018-194634, filed on Oct. 15, 2018, the entire contents of which are incorporated herein by reference.

TECHNICAL FIELD

The disclosed technology is related to a code information reading technique.

BACKGROUND

To avoid mistakes in shipment of products and ensure traceability of incorporated parts in factories for producing the products, for example, it is now required to keep the products and parts traceable until the products and parts are consumed or discarded. To trace the products and parts in such a manner, code information such as barcodes or QR codes (registered trademark) given to corrugated boards, products, parts, and the like are read at sites where the products and parts are shipped and received and at sites of production lines.

As a technique for reading code information, a method for retrieving information contained in a barcode has been proposed. This method includes a step of detecting that a barcode is present in a first image having a first image quality and capturing a first region. This method also includes a step of acquiring, when it is detected that the barcode is present, a second image having a second image quality and capturing a second region, the second image quality being higher than the first image quality, and the second region at least partly overlapping the first region. This method further includes a step of decoding the barcode based on the second image to retrieve the information.

There has also been proposed a technique for recognizing a barcode label attached to a moving object with high accuracy even when the barcode label passes in an unspecified direction. In this technique, images captured from a plurality of multi-camera units installed above a belt conveyor for moving a moving object to which a barcode label is attached are sent to a barcode recognition apparatus. The barcode recognition apparatus performs a filtering process on the input images to extract a barcode from the images captured from the multi-camera units. The barcode recognition apparatus then detects inclination of the extracted barcode, extracts a feature quantity of the barcode in accordance with the inclination, and recognizes the barcode based on the extracted feature quantity.

For example, the related art is disclosed in Japanese National Publication of International Patent Application No. 2011-513809 and Japanese Laid-open Patent Publication No. 9-185671.

SUMMARY

According to an aspect of the embodiments, a code information reading apparatus includes a memory, and a processor configured to read, upon detecting a code from a plurality of images sequentially captured, code information of the detected code, perform calculation of a detection frequency, in the plurality of images, of the code corresponding to the code information, and perform output of the code information in accordance with the calculated detection frequency.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a recording table according to the first embodiment.

FIG. 9 is a diagram illustrating an example of a recording table according to the second embodiment.

FIG. 10 is a diagram illustrating an example of probability calculation results.

FIG. 14 is a diagram illustrating an example of a recording table according to the third embodiment.

FIG. 15 is a diagram illustrating an example of probability calculation results.

DESCRIPTION OF EMBODIMENTS

At sites where tracing of products and parts described above is required, a method is currently adopted that requires a worker to manually read barcodes or QR codes (registered trademark) one by one with a handy-type code reader. In this case, a worker has to temporarily stop their intended work such as reception of products or incorporation of parts and take a code reader to read barcodes or QR codes (registered trademark). This consequently reduces the efficiency of the intended work.

There is also an installed-type barcode reader that is often used at shipment sites or the like, is installed above a belt conveyor, and reads a barcode at a timing at which a product flows thereunder or the like as in the related art described above. The installed-type barcode reader has a longer image-capturing possible distance and a wider image-capturing possible range than a common handy-type barcode reader. The installed-type barcode reader captures an image of one scene (one frame) at a timing of hardware interruption or the like, recognizes a barcode, and outputs a result.

To read a barcode or a QR code (registered trademark) from a captured image of one scene, the barcode or the QR code (registered trademark) has to be caught by the camera in a recognizable state at an image-capturing timing. That is, the barcode or the QR code (registered trademark) to be recognized has to be captured in a state where the barcode or the QR code (registered trademark) is not hidden by a worker, a shadow, or the like.

However, it is difficult to maintain the aforementioned state at an image-capturing timing at assembly lines where many workers are working or sites where products are received and shipped, without the workers being conscious of reading of barcodes or QR codes (registered trademark) while doing their intended work. Therefore, reading of code information in conventional technology may fail because a barcode or a QR code is hidden by a worker, a shadow, or the like.

Figure 1:
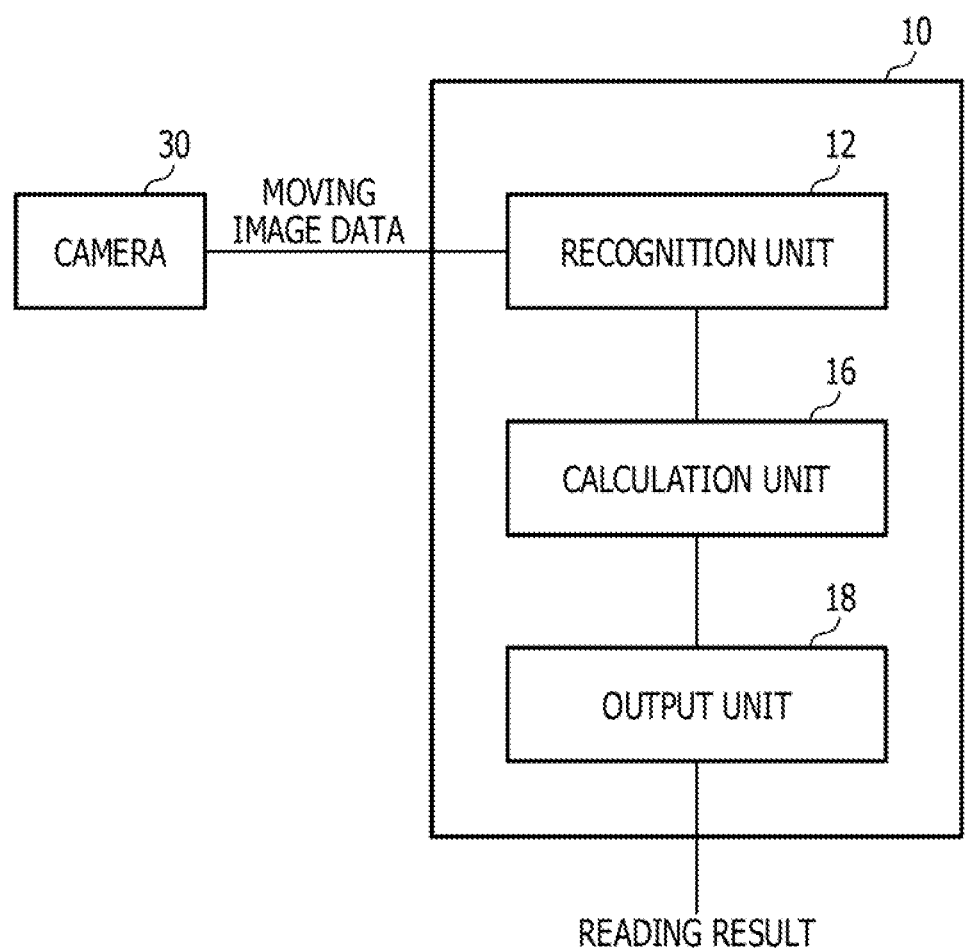
FIG. 1 is a functional block diagram of a code information reading apparatus according to a first embodiment.

As illustrated in FIG. 1, a code information reading apparatus 10 according to a first embodiment acquires moving image data captured by a camera 30 and outputs a reading result obtained by reading code information such as a barcode or a QR code (registered trademark) from the acquired moving image data.

For example, the camera 30 is installed above a flow line of reception and shipment lines of work-target products to which code information is given or above assembly lines. The camera 30 continuously captures a moving image of a region where workers are working on the products and outputs moving image data.

The code information reading apparatus 10 functionally includes a recognition unit 12, a calculation unit 16, and an output unit 18.

Figure 2:
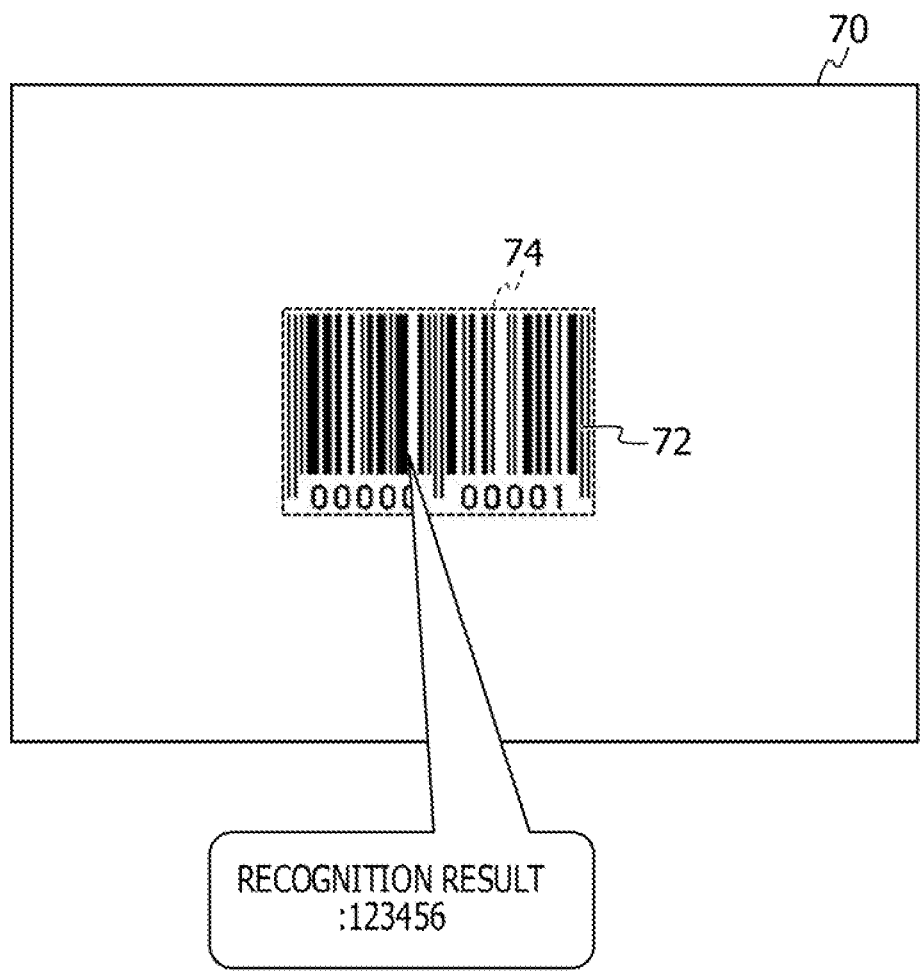
FIG. 2 is a diagram for describing detection and recognition of code information.

The recognition unit 12 detects code information from each of a plurality of frames included in the moving image data acquired from the camera 30 and recognizes a character string represented by the code information. Known techniques of the related art may be used for detecting and recognizing the code information. For example, as illustrated in FIG. 2, the recognition unit 12 detects a rectangular frame 74 surrounding the outer shape of code information 72 from each frame 70. The recognition unit 12 also recognizes an image in the rectangular frame 74 and acquires a character string that is a recognition result.

The recognition unit 12 records the recognition result for each frame 70 in a recording table 80 as illustrated in FIG. 3, for example, in association with a frame number of the frame 70. In the example illustrated in FIG. 3, a "frame number", a "recognition result", and a "probability" are recorded in the recording table 80 in association with one another. The "probability" will be described later.

When workers do their intended work such as reception of products or incorporation of parts without being conscious of reading of the code information 72, part of the code information 72 to be read may be lost, may be hidden by a hand, may be shaded, or the like. Consequently, detection and recognition of the code information 72 may fail in some cases.

Figure 4:
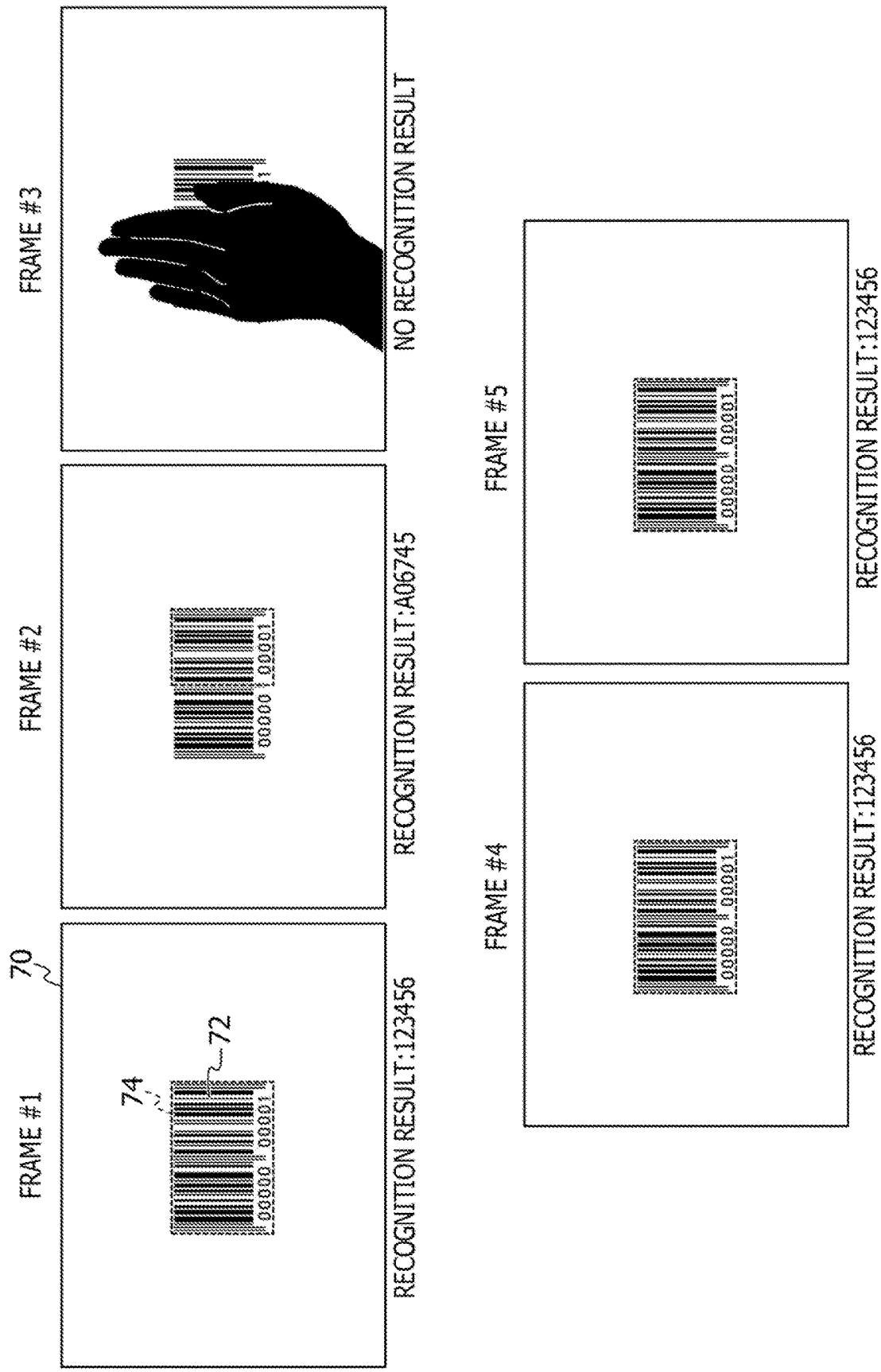
FIG. 4 is a diagram illustrating an example of detection results and recognition results of code information in a plurality of frames.

FIG. 4 illustrates an example of detection results and recognition results of the code information 72 in the plurality of frames 70. A frame number is given to each frame 70 sequentially from the starting frame 70 of the moving image data. Hereinafter, the frame 70 having a frame number i is referred to as a "frame #i". In the example illustrated in FIG. 4, the code information 72 is correctly detected and recognized in each of the frames #1 #4, and #5. On the other hand, in the frame #2, only part of the code information 72 is erroneously detected. Consequently, the recognition result of the code information 72 is also incorrect. Further, in the frame #3, a worker's hand is in the frame 70. Consequently, detection of the code information 72 fails and no recognition result is obtained.

As described above, correct recognition results and incorrect recognition results coexist among the recognition results obtained for the plurality of frames 70.

Accordingly, the calculation unit 16 statistically calculates a probability of the recognition result for each type of the recognition result obtained by the recognition unit 12. For example, the calculation unit 16 calculates, as the probability of the recognition result, an appearance frequency of each type of the recognition result against the number of frames included in the moving image data for a certain period. The certain period may be, for example, a period from the start to the end of work on one product.

For example, in the case of FIG. 4, the number of frames is equal to 5 and two types of recognition results, "123456" and "A06745", are obtained. The recognition result "123456" appears three times, and the recognition result "A06745" appears once. In this case, the calculation unit 16 calculates a probability of the recognition result "123456" to be "3/5 (60%)" and calculates a probability of the recognition result "A06745" to be "1/5 (20%)".

The calculation unit 16 may calculate the probability of each type of the recognition result every time the recognition result is obtained in each frame 70. In this case, the calculation unit 16 calculates the probability of each type of the recognition result, based on the number of frames up to the current frame 70 and the number times the type of the recognition result has appeared. The calculation unit 16 then records the calculated probability of each type of the recognition result in the "probability" field corresponding to the "frame number" in the recording table 80.

The output unit 18 outputs the recognition result selected from among the types of the recognition results as a final reading result, based on the probability calculation results of the recognition results obtained by the calculation unit 16. The recognition result selected as the final reading result may be a recognition result having the highest probability. A plurality of recognition results having a probability that is greater than or equal to a certain value may be selected.

Figure 5:
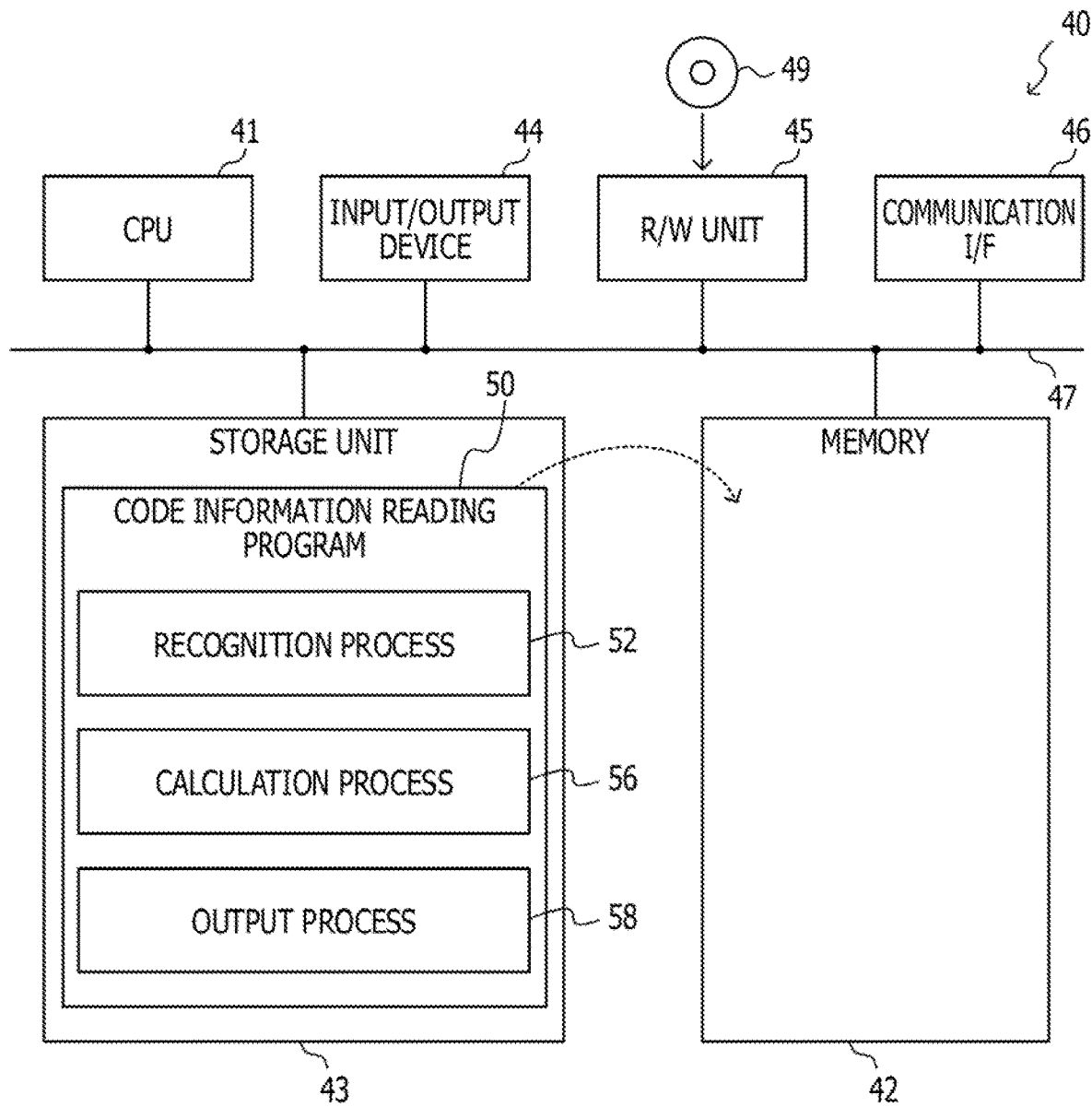
FIG. 5 is a block diagram illustrating a schematic configuration of a computer that functions as the code information reading apparatus according to the first embodiment.

The code information reading apparatus 10 may be implemented by, for example, a computer 40 illustrated in FIG. 5. The computer 40 includes a central processing unit (CPU) 41, a memory 42 serving as a temporary storage area, and a storage unit 43 that is nonvolatile. The computer 40 also includes an input/output device 44 such as an input unit and a display unit, and a read/write (R/W) unit 45 that controls reading and writing of data from and to a storage medium 49. The computer 40 also includes a communication interface (I/F) 46 that is coupled to a network such as the Internet. The CPU 41, the memory 42, the storage unit 43, the input/output device 44, the R/W unit 45, and the communication I/F 46 are coupled to each other via a bus 47.

The storage unit 43 may be implemented by a hard disk drive (HDD), a solid state drive (SSD), a flash memory, or the like. A code information reading program 50 for causing the computer 40 to function as the code information reading apparatus 10 is stored in the storage unit 43 serving as a storage medium. The code information reading program 50 includes a recognition process 52, a calculation process 56, and an output process 58.

The CPU 41 reads the code information reading program 50 from the storage unit 43, loads the code information reading program 50 to the memory 42, and sequentially executes the processes included in the code information reading program 50. The CPU 41 executes the recognition process 52 to operate as the recognition unit 12 illustrated in FIG. 1. The CPU 41 executes the calculation process 56 to operate as the calculation unit 16 illustrated in FIG. 1. The CPU 41 executes the output process 58 to operate as the output unit 18 illustrated in FIG. 1. Consequently, the computer 40 that executes the code information reading program 50 functions as the code information reading apparatus 10. The CPU 41 that executes the code information reading program 50 is hardware.

The functions implemented by the code information reading program 50 may also be implemented by, for example, a semiconductor integrated circuit, more specifically, an application specific integrated circuit (ASIC) or the like.

An operation performed by the code information reading apparatus 10 according to the first embodiment will be described next.

When a signal indicating the start of work for a work-target product to which the code information 72 such as a barcode or a QR code (registered trademark) is given is input to the code information reading apparatus 10, the code information reading apparatus 10 performs a code information reading process illustrated in FIG. 5. The code information reading process is an example of a code information reading method of the disclosed technology.

The signal indicating the start of work mentioned above may be, for example, a signal that is output in response to a worker pressing an operation switch when starting work for each product or a signal that is output from a sensor in response to the sensor detecting that a product that is conveyed by a belt conveyor or the like passes through a certain position. It may be identified that work for the current product is finished and work for the next product is to be started, when the frames 70 in which the code information 72 is not detected continue for a certain period or more (for example, one second or more) in the moving image data input to the code information reading apparatus 10 from the camera 30.

Figure 6:
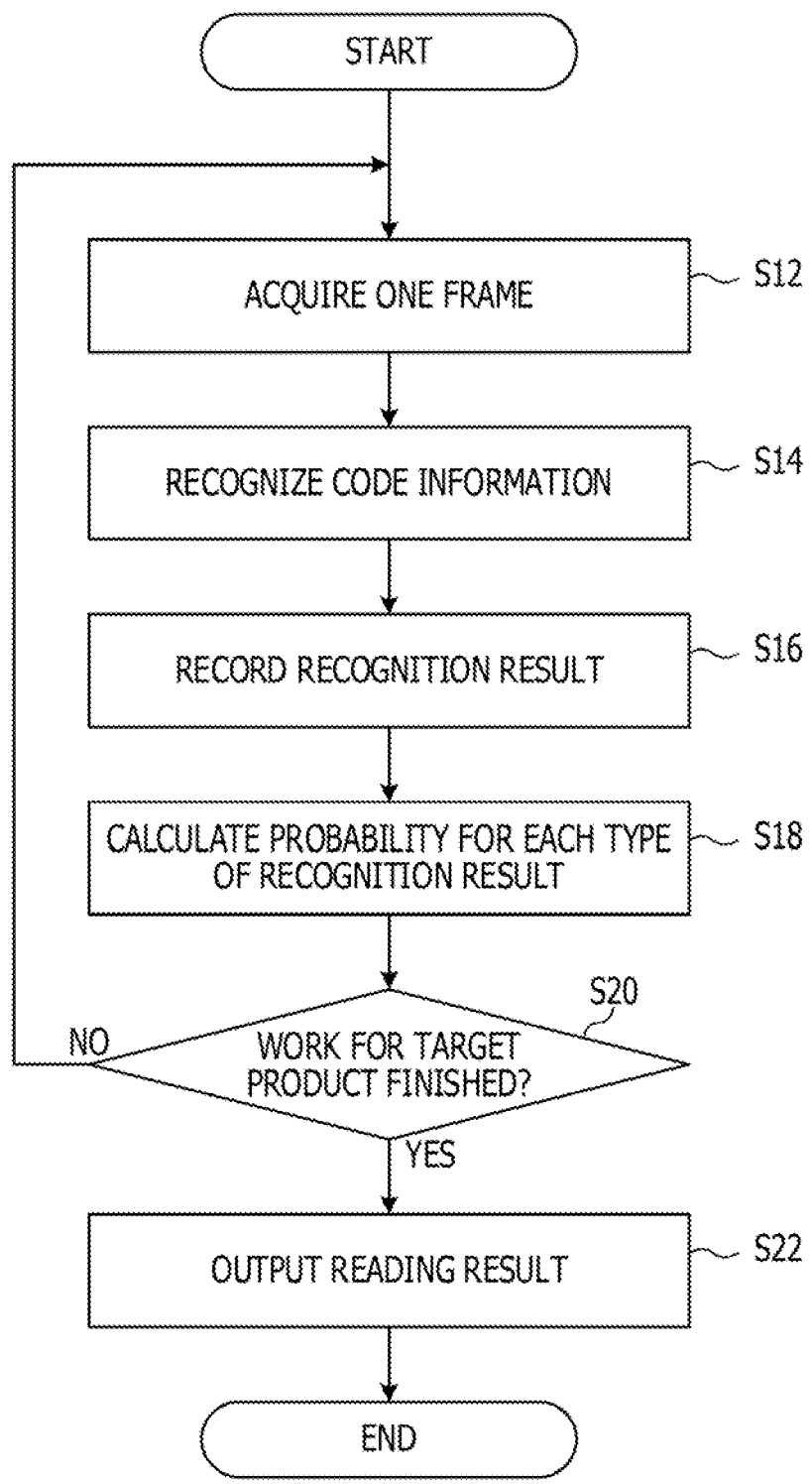
FIG. 6 is a flowchart illustrating an example of a code information reading process according to the first embodiment.

In step S12 of the code information reading process illustrated in FIG. 6, the recognition unit 12 acquires image data of one frame from the moving image data input from the camera 30.

In step S14, the recognition unit 12 then detects the code information 72 from the frame 70 acquired in step S12 and recognizes a character string represented by the code information 72.

In step S16, the recognition unit 12 then records the recognition result in the recording table 80 as illustrated in FIG. 3, for example, in association with the frame number. For example, when the recognition result "123456" is obtained in the frame #1, the recognition unit 12 records "1" in the "frame number" field of the recording table 80 and "123456" in the "recognition result" field of the recording table 80 as illustrated in FIG. 3.

In step S18, the calculation unit 16 then calculates, as the probability of the recognition result, an appearance frequency of each type of the recognition result against the number of frames that have been processed from the start of the work to the current time and records the calculated probability in the "probability" field of the recording table 80.

For example, in the case of the example described above, the number of frames up to the current frame is 1 and the recognition result "123456" appears once. Thus, a probability of "1/1 (100%)" of the recognition result "123456" is recorded in the "probability" field as illustrated in a column P in FIG. 3. Suppose that the recognition result "A06745", which is a kind different from that of the frame #1, is obtained in the frame #2. In this case, a probability of "1/2 (50%)" for the recognition result "123456" and a probability of "1/2 (50%)" for the recognition result "A06745" are recorded in the "probability" field as illustrated in a column Q in FIG. 3.

In step S20, the recognition unit 12 then determines whether the work for the product currently subjected to the work is finished. For example, it may be determined that the work is finished when a worker presses an operation switch indicating the end of the work, when a sensor detects that the work-target product is conveyed by a belt conveyor or the like and exits from a working area, or the like. When the aforementioned signal indicating the start of the work is input, it may be determined that the work for the next product is to be started, that is, the work for the product currently subjected to the work is finished. If the work for the product currently subjected to the work is not finished, the process returns to step S12. If the work is finished, the process proceeds to step S22.

In step S22, the output unit 18 outputs the recognition result selected from among the types of the recognition results as a final reading result, based on the probability calculation results of the recognition results determined by the calculation unit 16.

For example, suppose that recognition results up to the frame #5 and the probabilities of types of the recognition results are recorded in the recording table 80 as illustrated in FIG. 3 when it is determined in step S20 that the work for the product currently subjected to the work is finished. In this case, the output unit 18 selects the final reading result by using the probabilities calculated for the last frame 70 (the frame #5 in this case). For example, the output unit 18 may compare the probability of "3/5 (60%)" of the recognition result "123456" with the probability of "1/5 (20%)" of the recognition result "A06745" and outputs "123456" as the final reading result.

When the output of the final reading result is finished, the code information reading process ends. The code information reading apparatus 10 waits for input of the signal indicating the start of the next work. In the case where the determination in step S20 is made by using the signal indicating the start of the work, the process returns to step S12 after step S22 is finished.

As described above, the code information reading apparatus according to the first embodiment statistically calculates, for each type of recognition result obtained by recognizing code information from each of a plurality of frames included in moving image data, a probability of the recognition result. When workers do their intended work such as reception of products and incorporation of parts without being conscious of an operation for reading the code information, there may be frames from which the code information is not correctly recognized because part of the code information to be recognized is temporarily lost, is temporarily hidden by a hand, is temporarily shaded, or the like. The code information reading apparatus according to the first embodiment statistically processes the recognition result obtained from each of the plurality of frames of the moving image data as described above. Thus, the code information reading apparatus may accurately read the code information. That is, work for consciously reading the code information is no longer required. Consequently, the work for reading the code information given to each work-target object may become efficient.

In the first embodiment, the case has been described in which the probability is calculated based on the appearance frequency of each type of the recognition result against the total number of frames; however, the configuration is not limited thereto. For example, the probability may be calculated based on an appearance frequency of each type of the recognition result against the number of frames from which the recognition result is obtained among all the frames. In this case, for example, when there is a frame from which the recognition result is not obtained such as the frame #3 in FIGS. 3 and 4, such a frame is not used in the calculation of the probability.

In the first embodiment, the case has been described where the recognition result is selected based on the probabilities and the selected recognition result is output as the final reading result; however, the configuration is not limited thereto. Since the usage of the reading result depends on the processing performed at the subsequent stage, all the types of the recognition results may be associated with the probability calculation results of the respective types of the recognition results and may be output as the reading result. For example, in the case of the example illustrated in FIG. 3, the probability of "3/5 (60%)" of the recognition result "123456" and the probability of "1/5 (20%)" of the recognition result "A06745" may be collectively output as the reading result.

A second embodiment will be described next. In the first embodiment, the example has been described in which one piece of code information 72 is given to one work-target product; however, two or more pieces of code information 72 may be given to one product in some cases. Since workers do incorporating work or the like, the code information 72 is not necessarily present at the same position in every frame 70. Thus, when two or more pieces of code information 72 are included in one frame, recognition results have to be grouped by each piece of the code information 72.

In the second embodiment, a configuration addressing such a case will be described. In a code information reading apparatus according to the second embodiment, configurations that are substantially the same as those of the code information reading apparatus 10 according to the first embodiment are denoted by the same reference numerals, and a detailed description thereof will be omitted.

Figure 7:
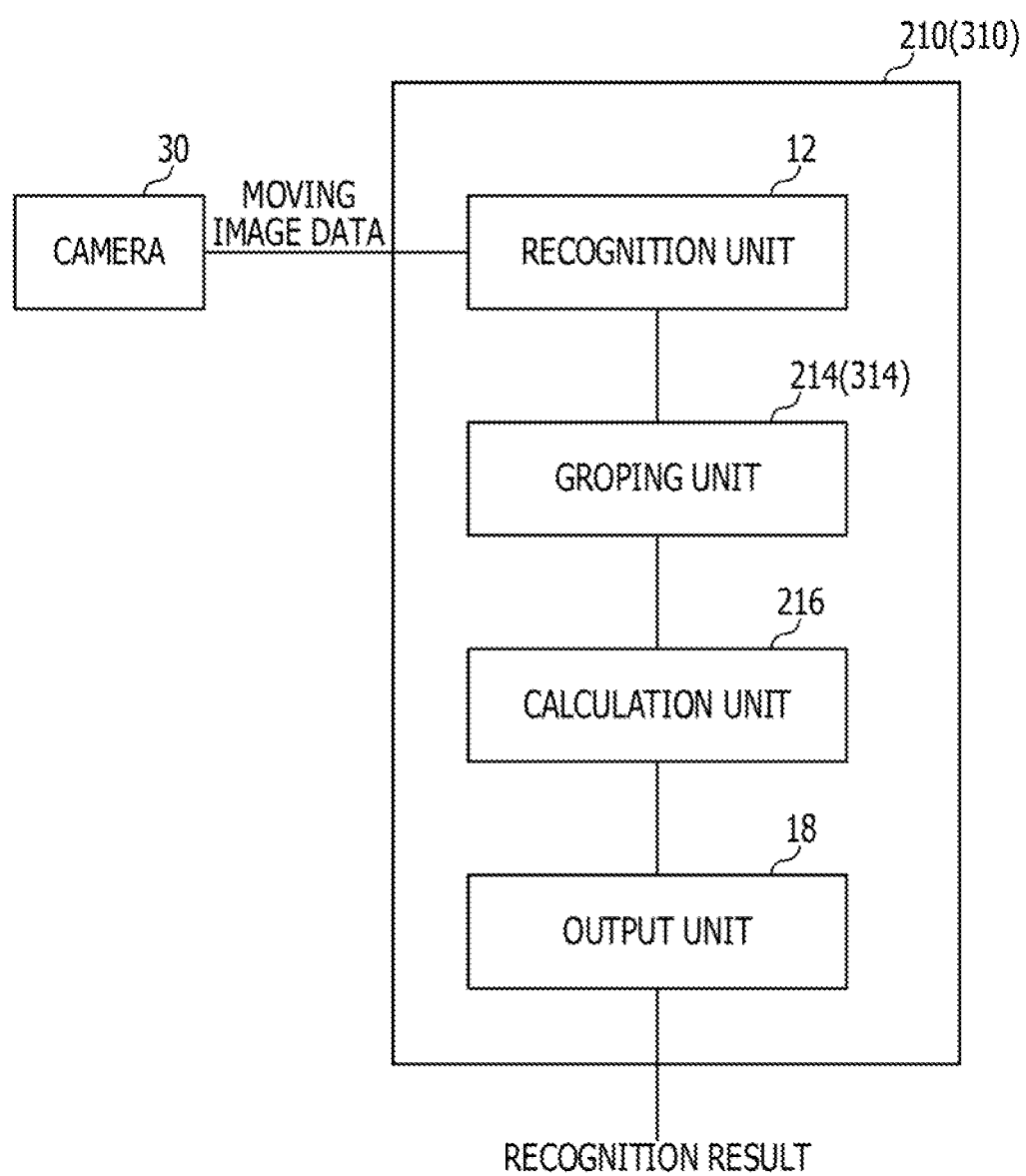
FIG. 7 is a functional block diagram of a code information reading apparatus according to second and third embodiments.

As illustrated in FIG. 7, a code information reading apparatus 210 according to the second embodiment functionally includes the recognition unit 12, a grouping unit 214, a calculation unit 216, and the output unit 18.

The grouping unit 214 groups the recognition results obtained from the plurality of frames 70, based on a feature of the code information 72 detected by the recognition unit 12. For example, the grouping unit 214 groups the recognition results estimated to be recognized from the same code information 72 into the same group. Specifically, the grouping unit 214 groups the recognition results by using information on the size of the code information 72 as a feature of the code information 72. When the code information 72 has a rectangular shape, the information on the size of the code information 72 may be an aspect ratio of the code information 72, at least one of a lengthwise size and a widthwise size of the code information 72, or the like. In the second embodiment, a case will be described where the lengthwise size and the widthwise size of the code information 72 are used.

Figure 8A:
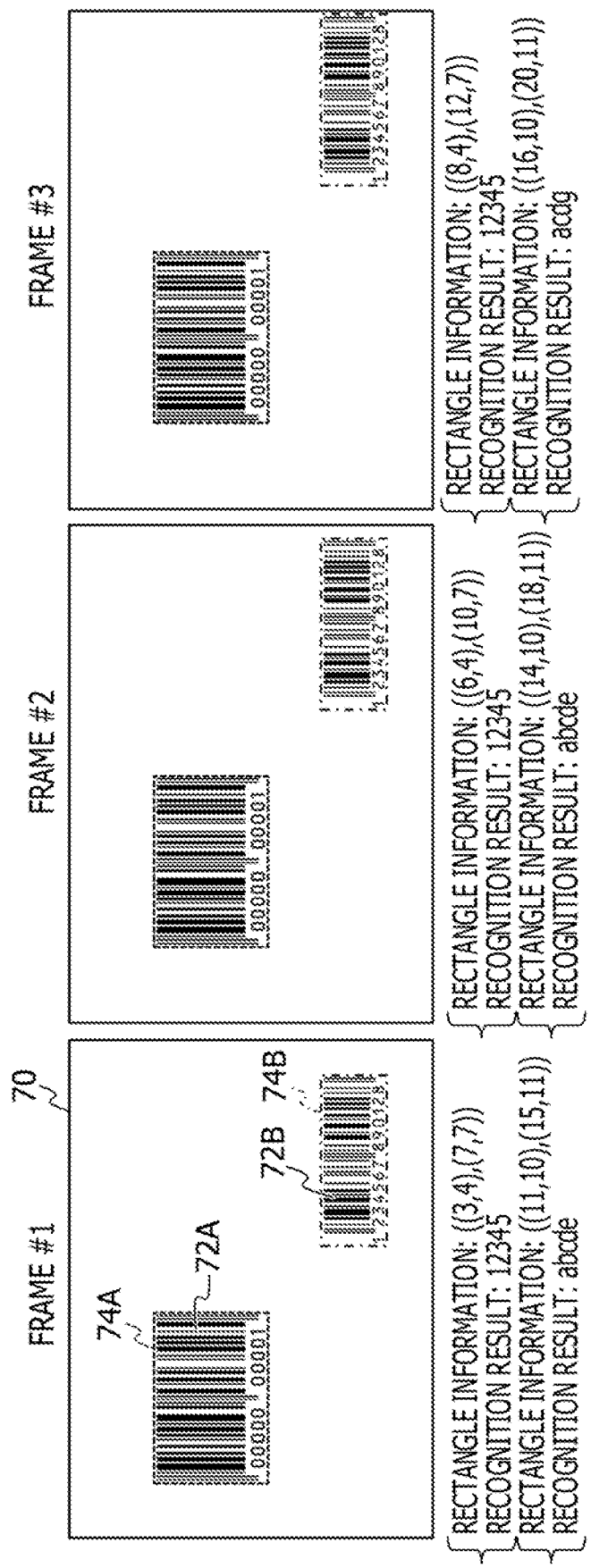
FIGS. 8A and 8B are diagrams illustrating an example of detection results and recognition results of code information in a plurality of frames.
Figure 8B:
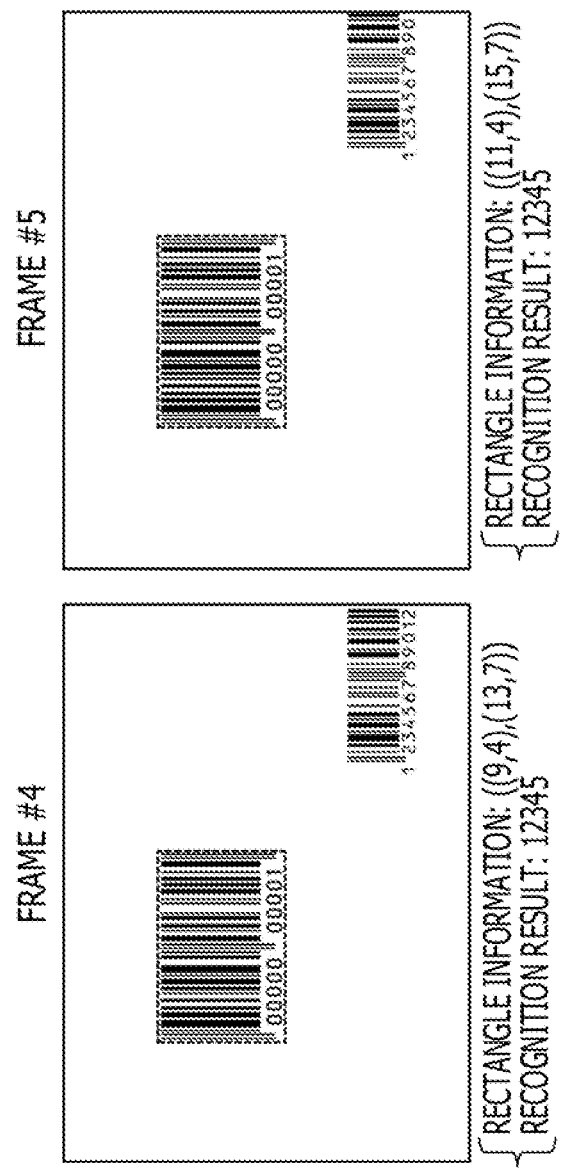

FIGS. 8A and 8B illustrate an example of a case where two different pieces of code information 72 are included in each frame 70. In the example illustrated in FIGS. 8A and 8B, in the frames #1 and #2, code information 72A is detected as indicated by a rectangular frame 74A and code information 72B is detected as indicated by a rectangular frame 74B. In the frame #3, the code information 72A and the code information 72B are detected. However, the code information 72B is incorrectly recognized. In the frames #4 and #5, the code information 72B is partially lost and the code information 72B itself is not detected. Thus, no recognition result is obtained.

When the code information 72A and the code information 72B are described without distinction, the code information 72A and the code information 72B are simply referred to as "code information 72" below. When the rectangular frames 74A and 74B are described without distinction, the rectangular frames 74A and 74B are simply referred to as "rectangular frames 74" below.

In the second embodiment, a coordinate position (x1, y1) of a pixel corresponding to the lower left corner of the rectangle and a coordinate position (x2, y2) of a pixel corresponding to the upper right corner of the rectangle are used as rectangle information representing the rectangular frame 74.

The grouping unit 214 calculates, for each frame 70, a lengthwise size (=x2−x1) and a widthwise size (=y2−y1) of the code information 72 from the rectangle information ((x1, y1), (x2, y2)) for each piece of the code information 72 detected from the frame 70. For example, in the frame #1 illustrated in FIGS. 8A and 8B, the grouping unit 214 calculates a lengthwise size (=7−3=4) and a widthwise size (=7−4) from rectangle information ((3, 4), (7, 7)) of the code information 72A whose recognition result is "12345".

The grouping unit 214 records the calculated sizes of the code information 72 in a "size" field of a recording table 280 as illustrated in FIG. 9, for example, in association with the frame number of the frame 70 and the recognition result. In the example illustrated in FIG. 9, the sizes are recorded in a form of the lengthwise size x the widthwise size of the code information 72 in the "size" field.

In the recording table 280 illustrated in FIG. 9, a "processing number" is assigned to each of the recognition results obtained from the respective frames 70. In addition to the "frame number" field and the "recognition result" field that are substantially the same as those of the recording table 80 in the first embodiment, the recording table 280 includes the "size" field described above and a "group" field described later.

The grouping unit 214 assigns a group to each of the recognition results, based on the size recorded in the recording table 280. Specifically, when the recognition result having a size that is equal to the calculated size is already recorded in the recording table 280, the grouping unit 214 assigns, to the recognition result, the same group as that of the recognition result of the equal size. When the recognition result of the equal size is not recorded in the recording table 280, the grouping unit 214 assigns a new group to the recognition result. The grouping unit 214 records identification information of the group assigned to each recognition result in the "group" field of the recording table 280.

For example, in the example illustrated in FIG. 9, the recognition result of the code information 72A indicated by the rectangular frame 74A detected from the frame #1 is recorded in the recording table 280 as a processing number #1. Since no other sizes are recorded at this point, the grouping unit 214 assigns a new group "A" to the recognition result. Likewise, the recognition result of the code information 72B indicated by the rectangular frame 74B detected from the frame #1 is recorded in the recording table 280 as a processing number #2. Since the size that is equal to the size "4×1" corresponding to the recognition result of the processing number #2 is not recorded at this point, the grouping unit 214 assigns a new group "B" to the recognition result.

The recognition result of the code information 72A indicated by the rectangular frame 74A detected from the frame #2 is recorded in the recording table 280 as a processing number #3. The size corresponding to the recognition result of the processing number #3 is "4×3", which is equal to the size corresponding to the recognition result of the processing number #1. Thus, the grouping unit 214 assigns the group "A" to the recognition result of the processing number #3 as in the case of the processing number #1.

The calculation unit 216 calculates, for each type of the recognition result in each group, a probability of the recognition result. Specifically, the calculation unit 216 calculates, as the probability of the recognition result, an appearance frequency of each type of the recognition result against a count of each group (the total number of recognition results included in each group).

For example, FIG. 10 illustrates probability calculation results based on the recording table 280 illustrated in FIG. 9. Specifically, as for the group "A", the count is equal to 5 and there is only one type of the recognition result "12345", which appears five times. In this case, the calculation unit 216 calculates a probability of the recognition result "12345" of the group "A" to be "5/5 (100%)". As for the group "B", the count is equal to 3 and there are two types of recognition results "abcde" and "acdg". The recognition result "abcde" appears twice, and the recognition result "acdg" appears once. In this case, the calculation unit 216 calculates a probability of the recognition result "abcde" to be "2/3 (66%)" and calculates a probability of the recognition result "acdg" to be "1/3 (33%)".

Figure 11:
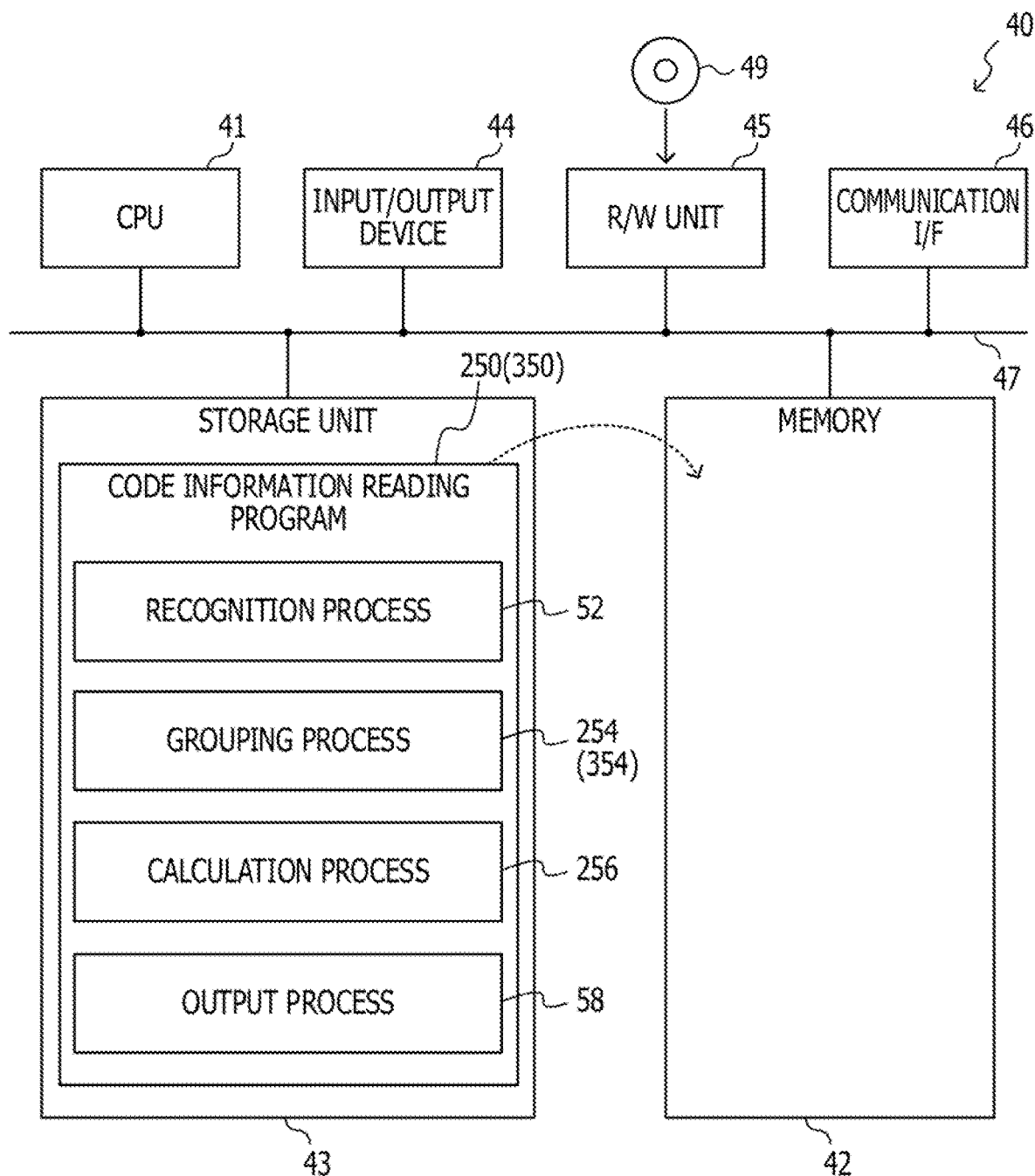
FIG. 11 is a block diagram illustrating a schematic configuration of a computer that functions as the code information reading apparatus according to the second and third embodiments.

The code information reading apparatus 210 may be implemented by, for example, the computer 40 illustrated in FIG. 11. A code information reading program 250 for causing the computer 40 to function as the code information reading apparatus 210 is stored in the storage unit 43 serving as a storage medium. The code information reading program 250 includes the recognition process 52, a grouping process 254, a calculation process 256, and the output process 58.

The CPU 41 reads the code information reading program 250 from the storage unit 43, loads the code information reading program 250 to the memory 42, and sequentially executes the processes included in the code information reading program 250. The CPU 41 executes the grouping process 254 to operate as the grouping unit 214 illustrated in FIG. 7. The CPU 41 executes the calculation process 256 to operate as the calculation unit 216 illustrated in FIG. 7. The other processes are substantially the same as those of the code information reading program 50 according to the first embodiment. Consequently, the computer 40 that executes the code information reading program 250 functions as the code information reading apparatus 210.

The functions that are implemented by the code information reading program 250 may also be implemented by, for example, a semiconductor integrated circuit, more specifically an ASIC or the like.

An operation performed by the code information reading apparatus 210 according to the second embodiment will be described next. In the second embodiment, the code information reading apparatus 210 performs a code information reading process illustrated in FIG. 12. In the code information reading process according to the second embodiment, processing that is substantially the same as that of the code information reading process according to the first embodiment is denoted by the same reference numeral, and a detailed description thereof will be omitted.

Figure 12:
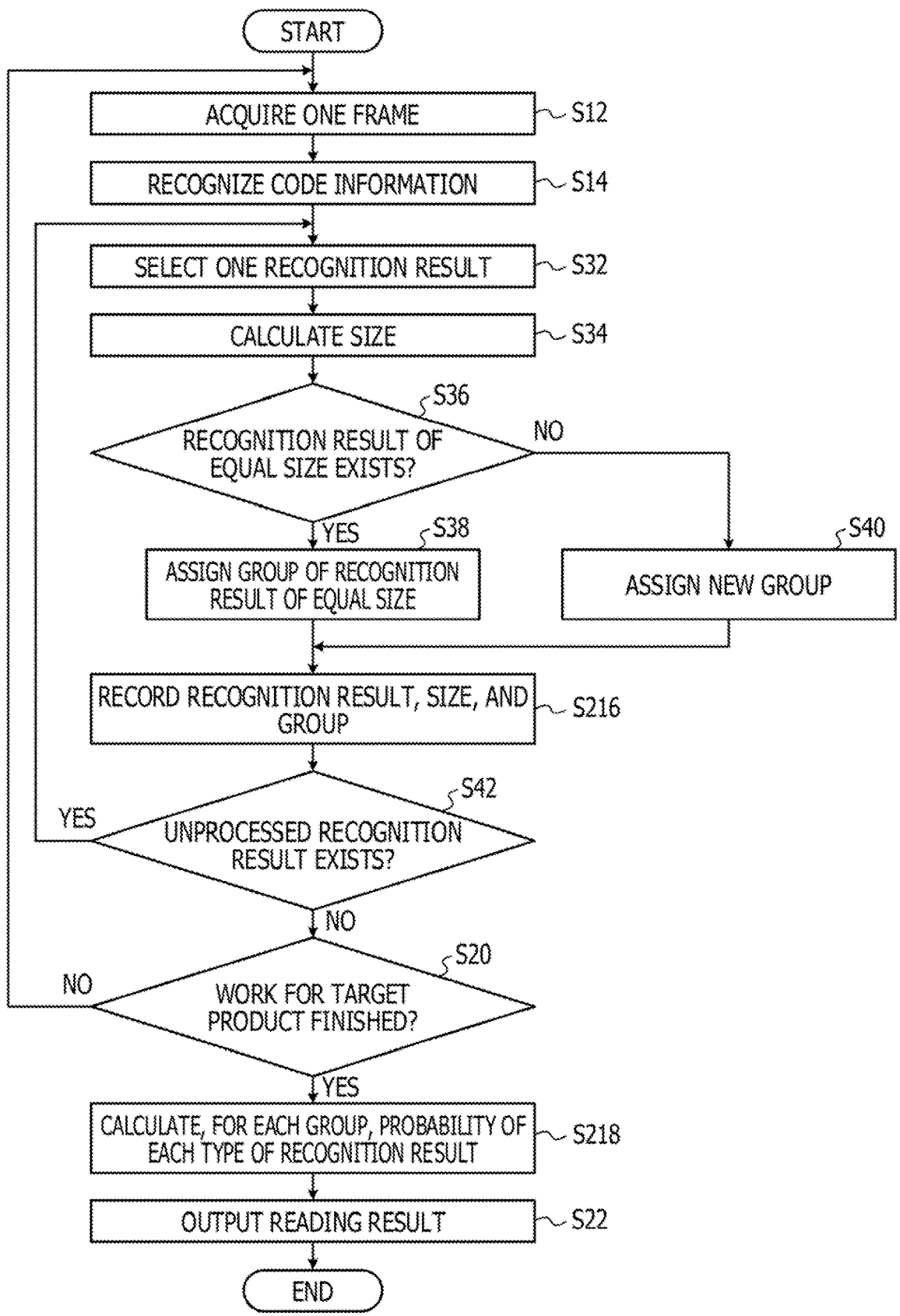
FIG. 12 is a flowchart illustrating an example of a code information reading process according to the second embodiment.

After steps S12 and S14 of the code information reading process illustrated in FIG. 12, the grouping unit 214 selects, in next step S32, one recognition result from among the recognition results obtained in step S14.

In step S34, the grouping unit 214 then calculates the size of the code information 72 corresponding to the recognition result selected in step S32, by using the rectangle information of the rectangular frame 74 corresponding to the selected recognition result.

In step S36, the grouping unit 214 then refers to the recording table 280 to determine whether there is a recognition result associated with a size that is equal to the size calculated in step S34. If there is a recognition result associated with the equal size, the process proceeds to step S38. If there is no such recognition result, the process proceeds to step S40.

In step S38, the grouping unit 214 assigns, to the recognition result selected in step S32, the same group as the group associated with the recognition result for which it is determined in step S36 that there is a recognition result associated with the equal size.

On the other hand, in step S40, the grouping unit 214 assigns a new group to the recognition result selected in step S32.

In step S216, the recognition unit 12 then records the recognition result selected in step S32 in the "recognition result" field of the recording table 280. The grouping unit 214 also records the size calculated in step S34 and identification information of the group assigned in step S38 or S40 in the "size" and "group" fields of the recording table 280, respectively.

In step S42, the grouping unit 214 then determines whether there is a recognition result for which the processing of steps S32 to S216 is not performed among the recognition results obtained in step S14. If there is an unprocessed recognition result, the process returns to step S32. If there is no unprocessed recognition result, the process proceeds to step S20.

If it is determined in step S20 that the work for the product currently subjected to the work is finished, the calculation unit 216 calculates, for each type of the recognition result in each group, a probability of the recognition result in step S218.

In step S22, the output unit 18 then outputs a final reading result. For example, in the case of the examples illustrated in FIGS. 9 and 10, the output unit 18 outputs "12345" having a probability of "100%" for the group A and outputs the recognition result "abcde" having a higher probability for the group B, as the final reading result. The code information reading process then ends.

As described above, the code information reading apparatus according to the second embodiment groups recognition results obtained from a plurality of frames based on a feature of code information such as a size of the code information. The code information reading apparatus calculates, for each type of the recognition result in each group, a probability of the recognition result. Consequently, the code information reading apparatus may achieve advantages similar to those of the first embodiment and may accurately obtain, even when a plurality of pieces of code information are included in one frame, a recognition result of each piece of code information.

In the second embodiment, the case has been described where the probability of each recognition result is calculated after the work for one product is finished; however, the configuration is not limited thereto. As in the first embodiment, the probability may be calculated for each frame, and the final reading result may be output by using the probabilities calculated for the final frame.

In the second embodiment, the case has been described where when the size of the code information 72 is equal to a recorded size, the same group is assigned to the recognition result of the code information 72; however, determination as to whether the sizes are equal is not limited to determination as to whether the sizes completely match. Even when a difference in the size of the code information 72 is less than or equal to a certain value, it may be determined that the sizes are equal in consideration of a detection error of the code information 72.

A third embodiment will be described next. In the second embodiment, the case has been described that one frame includes two or more pieces of code information 72 having different features such as sizes. However, one frame may include different pieces of code information 72 having the same feature such as the size. In such a case, recognition results may not be correctly grouped by grouping based on a feature such as the size.

In the third embodiment, a configuration addressing such a case will be described. In a code information reading apparatus according to the third embodiment, configurations that are substantially the same as those of the code information reading apparatus 210 according to the second embodiment are denoted by the same reference numerals, and a detailed description thereof will be omitted.

As illustrated in FIG. 7, a code information reading apparatus 310 according to the third embodiment functionally includes the recognition unit 12, a grouping unit 314, the calculation unit 216, and the output unit 18.

The grouping unit 314 groups pieces of code information 72 by using information on positions of the pieces of code information 72 in the respective frames 70. For example, when a difference between positions of the pieces of code information 72 in two consecutive frames 70 is less than or equal to a certain value, the grouping unit 314 groups the pieces of code information 72 included in the two frames 70 to the same group. When the difference between the positions of the pieces of code information 72 exceeds the certain value, the grouping unit 314 groups the pieces of code information 72 included in the two frames 70 to different groups.

Figure 13A:
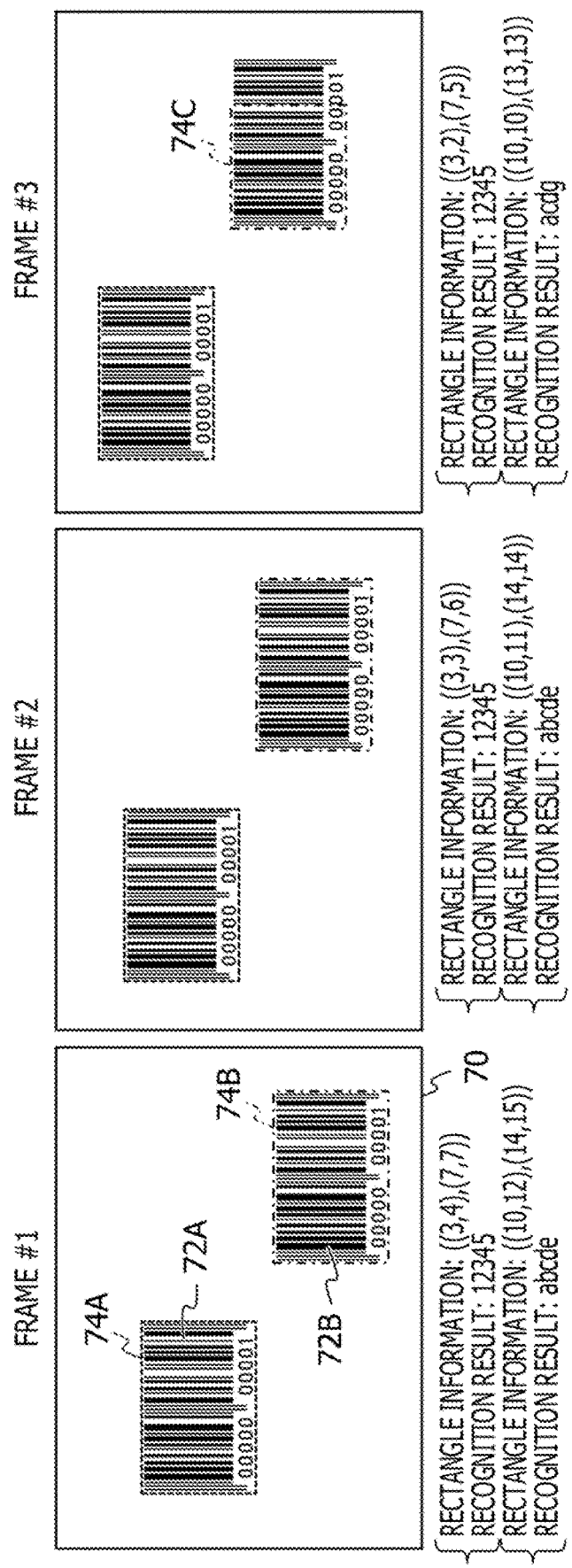
FIGS. 13A and 13B are diagrams illustrating an example of detection results and recognition results of code information in a plurality of frames.
Figure 13B:
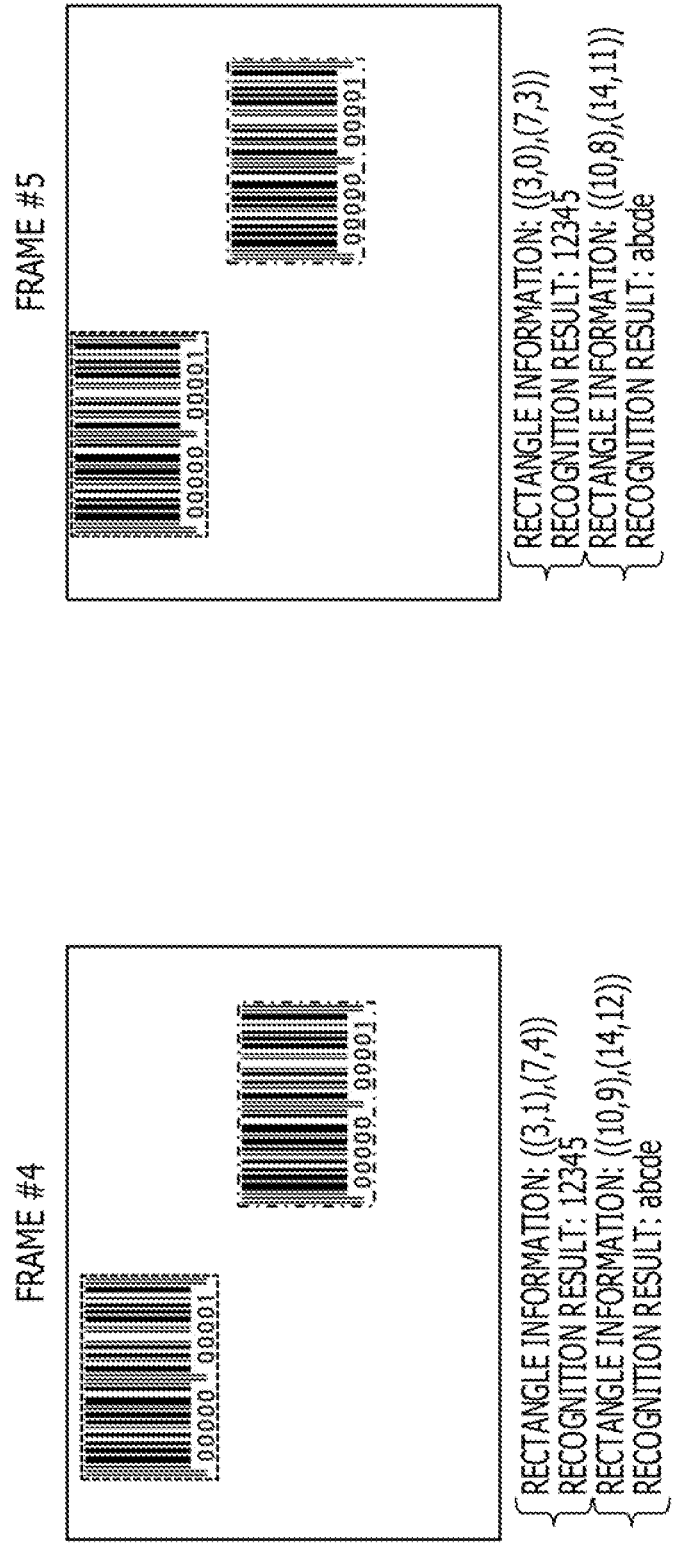

FIGS. 13A and 13B illustrate an example of a case where two pieces of code information 72 having an equal size are included in each frame 70. In the example illustrated in FIGS. 13A and 13B, the code information 72A is detected from each frame 70 as indicated by the rectangular frame 74A. The code information 72B is detected from the frames #1, #2, #4, and #5 as indicated by the rectangular frame 74B.

The code information 72B is erroneously detected in the frame #3 as illustrated by a rectangular frame 74C. As a result, an error is also caused in the recognition result of the code information 72B.

The grouping unit 314 records, for each frame 70, a reference position (x0, y0) for each piece of the code information 72 detected from the current frame 70 in a "position" field of a recording table 380 as illustrated in FIG. 14, for example, in association with the frame number of the frame 70 and the recognition result. The reference position may be, for example, a coordinate position of the lower left corner of the rectangular frame 74 in which the code information 72 is detected.

In addition to the "position" field described above, the recording table 380 illustrated in FIG. 14 includes the "processing number" field, the "frame number" field, the "recognition result" field, and the "group" field that are substantially the same as those of the recording table 280 in the second embodiment.

The grouping unit 314 calculates, for each frame 70, a difference between the reference position (x0, y0) of each piece of the code information 72 detected from the current frame 70 and a reference position (xi, yi) of each piece of code information 72 detected from the previous frame 70. The grouping unit 14 calculates a positional difference Di in a following manner.

$$Di=\sqrt{((xi-x0)^2+(yi-y0)^2)}$$

When the positional difference Di is less than or equal to a certain value a, the grouping unit 314 assigns the same group as that of the recognition result corresponding to the reference position (xi, yi) to the recognition result of the code information 72 having the reference position (x0, y0). When the positional difference Di exceeds the certain value a, the grouping unit 314 assigns a new group to the recognition result of the code information 72 having the reference position (x0, y0).

The certain value a may be set based on, for example, a maximum moving distance of the code information 72 in a period of one frame. Specifically, when the work-target object to which the code information 72 is given is on a line such as a belt conveyor, a moving distance in a period of one frame (33 msec in the case of 30 fps) is determined from the moving speed of the line. The moving distance is then converted to the number of pixels in the frame 70. The number of pixels may be used as the certain value a. The certain value a may be determined in consideration of an movement amount as a result of a worker performing work on the work-target object as well as the moving speed of the line. A margin may be included in the certain value a in consideration of a positional error caused when the code information 72 is detected using the rectangular frame 74.

The grouping unit 314 records identification information of the group assigned to each recognition result in the "group" field of the recording table 380.

For example, suppose that the current frame 70 is the frame #2. In such a case, a description will be given of a group to be assigned to the recognition result associated with the processing number #3 in the current frame #2 by using the example illustrated in FIGS. 13A and 13B. The reference position (x0, y0) for the processing number #3 is (3, 3). The grouping unit 314 calculates a difference between the reference position (x0, y0) (3, 3) and the reference position (x1, y1)=(3, 4) for the processing number #1 in the previous frame #1 and a difference between the reference position (x0, y0)=(3, 3) and the reference position (x2, y2)=(10, 12) for the processing number #2 in the previous frame #1 in a following manner.

$$D1=\sqrt{((3-3)^2+(4-3)^2)}=1$$

$$D2=\sqrt{((10-3)^2+(12-3)^2)}=11.4$$

For example, when the certain value a=3, since D1≤a and D2>a, the grouping unit 314 assigns the group "A" assigned to the recognition result of the processing number #1, to the recognition result of the processing number #3. When the differences between the reference position in the current frame 70 and all the reference positions in the previous frame 70 exceed the certain value a, the grouping unit 314 assigns a new group to the recognition result of the current frame 70. When there are a plurality of reference positions for which D1≤a is satisfied in the previous frame 70, the group corresponding to the closest reference position in terms of the distance may be assigned.

As in the second embodiment, the calculation unit 216 calculates, for each type of recognition result in each group, a probability of the recognition result.

For example, FIG. 15 illustrates probability calculation results based on the recording table 380 illustrated in FIG. 14. Specifically, as for the group "A", the count is equal to 5 and there is only one type of the recognition result "12345", which appears five times. In this case, the calculation unit 216 calculates a probability of the recognition result "12345" of the group "A" to be "5/5 (100%)". As for the group "B", the count is equal to 5 and two types of recognition results "abcde" and "acdg" are obtained. The recognition result "abcde" appears four times, and the recognition result "acdg" appears once. In this case, the calculation unit 216 calculates a probability of the recognition result "abcde" to be "4/5 (80%)" and calculates a probability of the recognition result "acdg" to be "1/5 (20%)".

The code information reading apparatus 310 may be implemented by, for example, the computer 40 illustrated in FIG. 11. A code information reading program 350 for causing the computer 40 to function as the code information reading apparatus 310 is stored in the storage unit 43 serving as a storage medium. The code information reading program 350 includes the recognition process 52, a grouping process 354, the calculation process 256, and the output process 58.

The CPU 41 reads the code information reading program 350 from the storage unit 43, loads the code information reading program 350 to the memory 42, and sequentially executes the processes included in the code information reading program 350. The CPU 41 executes the grouping process 354 to operate as the grouping unit 314 illustrated in FIG. 7. The other processes are substantially the same as those of the code information reading program 250 according to the second embodiment. Consequently, the computer 40 that executes the code information reading program 350 functions as the code information reading apparatus 310.

The functions that are implemented by the code information reading program 350 may also be implemented by, for example, a semiconductor integrated circuit, more specifically an ASIC or the like.

An operation performed by the code information reading apparatus 310 according to the third embodiment will be described. As in the second embodiment, the code information reading process illustrated in FIG. 12 is performed in the third embodiment. Differences from the code information reading process according to the second embodiment will be described below.

In step S34, the grouping unit 314 calculates the positional difference Di between the reference position (x0, y0) corresponding to the recognition result selected in step S32 and the reference position (xi, yi) of each recognition result in the previous frame 70. In step S36, the grouping unit 314 determines whether there is the reference position (xi, yi) for which the positional difference Di is less than or equal to the certain value a. If there is the reference position (xi, yi) for which Di≤a is satisfied, the process proceeds to step S38. If there is no such reference position (xi, yi), the process proceeds to step S40.

In step S38, the grouping unit 314 assigns the same group as that of the recognition result corresponding to the reference position (xi, yi) for which Di≤a is satisfied, to the recognition result corresponding to the reference position (x0, y0). On the other hand, in step S40, the grouping unit 314 assigns a new group to the recognition result corresponding to the reference position (x0, y0).

As described above, the code information reading apparatus according to the third embodiment groups the recognition results obtained from a plurality of frames, based on differences between the positions of the pieces of code information in the frames. The code information reading apparatus calculates, for each type of the recognition result in each group, a probability of the recognition result. Consequently, the code information reading apparatus may achieve advantages similar to those of the first embodiment and may accurately obtain, even when a plurality of pieces of code information having the same feature such as a size are included in one frame, a recognition result of each piece of code information.

Figure 16:
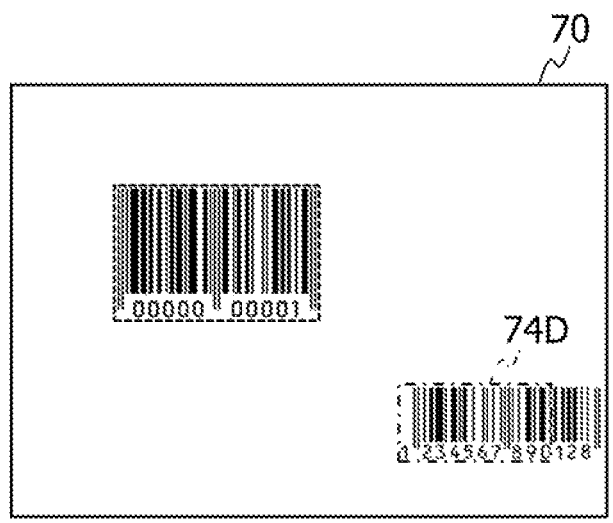
FIG. 16 is a diagram illustrating an example of detection results and recognition results of code information.

There is a case where only part of the code information 72 is temporarily detected and consequently an error occurs in the recognition result as illustrated in FIG. 16. In such a case, an inconvenience may arise when recognition results are grouped according to information regarding the size of the code information 72 as in the second embodiment. For example, a new group is assigned for a size of a rectangular frame 74D that is temporarily detected in the frame 70 illustrated in FIG. 16, and a probability of the recognition result "acd" of the group is calculated to be 1/1 (100%).

To avoid such a case, the probability of each type of the recognition result may be calculated after the recognition result that may be erroneous recognition is excluded. For example, a recognition result for which the size of the rectangular frame 74 does not match a predetermined size, a recognition result for which the character string at the starting part does not match a predetermined character string, a recognition result for which the number of characters does not match a predetermined number of characters, or the like may be excluded. A recognition result that does not appear consecutively in two or more frames (that temporarily appears) may be excluded.

Although barcodes are illustrated and described as an example of the code information in each of the embodiments described above, the embodiments are similarly applicable to QR codes (registered trademark).

In the embodiments described above, a configuration in which the code information reading program is stored (installed) in a storage unit in advance has been described; however, the configuration is not limited thereto. The code information reading program according to the disclosed technology may be provided in a form of a storage medium such as a compact disc read-only memory (CD-ROM), a digital versatile disc (DVD)-ROM a Universal Serial Bus (USB) memory, or the like having stored therein the code information reading program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A code information reading apparatus comprising:
   a memory; and
   a processor coupled to the memory and the processor configured to:
   read, upon detecting a code from a plurality of images sequentially captured, code information of the detected code,
   perform calculation of a detection frequency, in the plurality of images, of the code corresponding to the code information, and
   perform output of the code information in accordance with the calculated detection frequency, wherein
   the output includes:
     when the code information includes a plurality of types of the code information, selecting a first type of the code information from among the plurality of types of code information in accordance with the detection frequency calculated for each of the plurality of types of the code information, and
     outputting the selected first type of the code information.

2. The code information reading apparatus according to claim 1, wherein
   there are a plurality of types of codes, and
   the calculation includes calculating the detection frequency for each type of the code corresponding to the code information.

3. The code information reading apparatus according to claim 1, wherein
   the calculation includes:
     classifying the code information to a plurality of groups, and
     calculating, separately for each group included in the plurality of groups, the detection frequency of the code corresponding to the code information included in a group.

4. The code information reading apparatus according to claim 3, wherein
   the classifying is performed based on at least one of a size of the code and a position of the code as detected in the plurality of images.

5. The code information reading apparatus according to claim 4, wherein
   the size of the code is an aspect ratio of the code as detected in each of the plurality of images or at least one of a widthwise size and a lengthwise size of the code as detected in each of the plurality of images.

6. The code information reading apparatus according to claim 3, wherein
   the classifying is performed based on a position of the code,
   the plurality of images includes a first image and a second image,
   the code includes a first code detected in the first image and a second code detected in the second image,
   when a difference between a first position of the first code in the first image and a second position of the second code in the second image is not more than a threshold, a first type of the code information corresponding to the first code and a second type of the code information corresponding to the second code are classified into a group in the classifying, and
   when the difference between the first position and the second position is more than the threshold, the first type of the code information and the second type of the code information are classified into different groups in the classifying.

7. The code information reading apparatus according to claim 1, wherein
   a value of the detection frequency of the first type of the code information is the greatest among a value of each the detection frequency of the plurality of types of the code information, or is not less than a threshold.

8. The code information reading apparatus according to claim 1, wherein
   the output includes outputting information indicating the detection frequency in association with the code information.

9. A computer-implemented code information reading method comprising:
   reading, upon detecting a code from a plurality of images sequentially captured, code information of the detected code;
   calculating a detection frequency, in the plurality of images, of the code corresponding to the code information; and
   outputting the code information in accordance with the calculated detection frequency, wherein
   the outputting includes:
     when the code information includes a plurality of types of the code information, selecting a first type of the code information from among the plurality of types of code information in accordance with the detection frequency calculated for each of the plurality of types of the code information, and
     outputting the selected first type of the code information.

10. The code information reading method according to claim 9, wherein
    there are a plurality of types of codes, and
    the calculating includes calculating the detection frequency for each type of the code corresponding to the code information.

11. The code information reading method according to claim 9, wherein
    the calculating includes:
      classifying the code information to a plurality of groups, and
      calculating, separately for each group included in the plurality of groups, the detection frequency of the code corresponding to the code information included in a group.

12. The code information reading method according to claim 11, wherein
    the classifying is performed based on at least one of a size of the code and a position of the code as detected in the plurality of images.

13. The code information reading method according to claim 12, wherein the size of the code is an aspect ratio of the code as detected in each of the plurality of images or at least one of a widthwise size and a lengthwise size of the code as detected in each of the plurality of images.

14. The code information reading method according to claim 11, wherein the classifying is performed based on a position of the code, the plurality of images includes a first image and a second image, the code includes a first code detected in the first image and a second code detected in the second image, when a difference between a first position of the first code in the first image and a second position of the second code in the second image is not more than a threshold, a first type of the code information corresponding to the first code and a second type of the code information corresponding to the second code are classified into a group in the classifying, and when the difference between the first position and the second position is more than the threshold, the first type of the code information and the second type of the code information are classified into different groups in the classifying.

15. The code information reading method according to claim 9, wherein a value of the detection frequency of the first type of the code information is the greatest among a value of each the detection frequency of the plurality of types of the code information, or is not less than a threshold.

16. The code information reading method according to claim 9, wherein the outputting includes outputting information indicating the detection frequency in association with the code information.

17. A non-transitory computer-readable medium storing instructions executable by one or more computers, the instructions comprising:

one or more instructions for reading, upon detecting a code from a plurality of images sequentially captured, code information of the detected code;

one or more instructions for calculating a detection frequency, in the plurality of images, of the code corresponding to the code information; and one or more instructions for outputting the code information in accordance with the calculated detection frequency, wherein the outputting includes:

when the code information includes a plurality of types of the code information, selecting a first type of the code information from among the plurality of types of code information in accordance with the detection frequency calculated for each of the plurality of types of the code information, and outputting the selected first type of the code information.

* * * * *